3,324,118
PHENALKYLMERCAPTOMETHYL CEPHALOSPORINS

Edwin H. Flynn, Indianapolis, Ind., assignor to Eli Lilly and Company, Indianapolis, Ind., a corporation of Indiana
No Drawing. Filed Dec. 27, 1965, Ser. No. 516,784
4 Claims. (Cl. 260—243)

This application is a continuation-in-part of my application Ser. No. 99,998, filed Apr. 3, 1961, now abandoned.

This invention relates to novel antibiotic substances and to methods for their preparation and use.

The novel compounds of the present invention are improved 7-mercaptoacetamido derivatives of cephalosporanic acid, having the following formula:

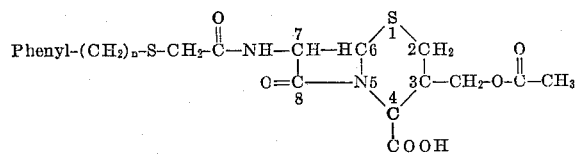

and the salts thereof with pharmaceutically acceptable cations, in which $n$ is 2, 3, or 4.

The compounds of the present invention are highly effective antibacterial agents, being orally absorbed and lower in median effective dose against hemolytic streptococci than the 7-mercaptoacetamido cephalosporins of the prior art. They are characterized by penicillinase-resistance, acid stability, and activity against a broad range of microorganisms, being particularly effective against the gram-positive pathogens. They are conveniently prepared and administered in the form of the salts of the carboxyl group with pharmaceutically acceptable cations, including, for example, water-soluble salts such as the sodium, potassium, lithium, ammonium, and substituted ammonium salts, as well as the less water-soluble salts such as the calcium, barium, procaine, quinine, and dibenzylethylenediamine salts. Administration is preferably by intramuscular injection in isotonic saline at a dose (for adults) around 0.25 to 0.50 g. every four to six hours. Oral administration generally requires a somewhat higher dosage, from 0.50 to 1.0 g. every four to six hours, and can be carried out in the form of pressed tablets, filled gelatin capsules, or suspensions of conventional type or the like.

The source material for the compounds of the present invention is cephalosporin C, more precisely known as 7-(5'-aminoadipamido)cephalosporanic acid, which can be prepared by cultivating a cephalosporin C-producing organism in a suitable nutrient medium, as described in British Patent Specification 810,196, published Mar. 11, 1959.

Cephalosporin C is readily converted into the corresponding nucleus compound, 7 - aminocephalosporanic acid, by cleaving the 5'-amino-N'-adipamyl side chain between its amido carbonyl group and its amido nitrogen, suitably by reacting cephalosporin C with nitrosyl chloride in formic acid, then hydrolytically cleaving, according to the method of Morin et al. described in U.S. Patent 3,188,311 (June 8, 1965).

The nucleus thus obtained is conveniently converted into a 7 - acylamidocephalosporanic acid as desired by acylation. For this purpose, any of the conventional acylation procedures can be employed, utilizing any of the various types of known acylating agents having the composition which yields the desired side chain. A convenient acrylating agent is the appropriate acyl chloride or bromide. The acylation is carried out in water or an appropriate organic solvent, preferably under substantially neutral conditions, and preferably at reduced temperature, i.e., above the freezing point of the reaction mixture and up to about 20° C. In a typical procedure, 7-aminocephalosporanic acid is dissolved in water with a sufficient quantity of sodium bicarbonate or other appropriate alkali to promote solution, the concentration of the 7 - aminocephalosporanic acid being about 1 to about 4 percent by weight. The solution is cooled to around 0 to 5° C., and a solution of the acylating agent is added in about 20 percent excess, with stirring and cooling. The pH of the mixture can be maintained, if it tends to vary, around the neutral level by bubbling carbon dioxide therein. After addition of the acylating agent has been completed, stirring of the reaction mixture is continued and the mixture is allowed to warm to room temperature. The reaction product is then acidified to around pH 2 and extracted with an organic solvent such as ethyl acetate. The ethyl acetate extract is back-extracted with water at pH 5.5 to 6, employing for pH adjustment a base containing the cation of the desired final product. The water solution is separated and evaporated substantially to dryness. The residue is taken up in a minium quantity of water and the acylation product is precipitated by adding a large excess of acetone, and if necessary, ether. The crystalline product obtained thereby is filtered, washed with acetone, and dried.

The acylation can also be carried out with the corresponding carboxylic acid, employed in conjunction with an equimolar proportion of a carbodiimide such as N,N'-diisopropylcarbodiimide, N,N'-dicyclohexylcarbodiimide, N,N'-bis(p-dimethylaminophenyl) carbodiimide, N-ethyl-N'-(4"-ethylmorpholinyl)carbodiimide, or the like, and the acylation proceeds at ordinary temperatures in such cases. Alternatively, the carboxylic acid can be converted into the corresponding acid anhydride, or into the azide, or into an activated ester, and any of these derivatives can be used to effect the desired acylation. Other agents can readily be ascertained from the art.

The acylating agents required in the preparation of the compounds of the present invention are readily obtained by methods well known in the art.

The invention will be more readily understood from the following operating examples, which are submitted as illustrations only, and not by way of limitation.

Example 1

7-aminocephalosporanic acid (1.0 g.) and sodium bicarbonate (1.0 g.) were dissolved in approximately 50 percent aqueous acetone. The solution was cooled in an ice bath, and phenethylmercaptoacetyl chloride (750 mg., dissolved in a minimum quantity of acetone) was added with stirring over a period of 45 minutes, after which the stirring was continued for 2.5 hours while the mixture warmed to room temperature. The acetone was then stripped out at ordinary temperature, employing a rotating flask evaporator at reduced pressure. The resulting aqueous solution was acidified to pH 2.0 with concentrated hydrochloric acid and extracted with ethyl acetate. The ethyl acetate phase was separated, adjusted to pH 5.5 with 0.5 N aqueous potassium hydroxide solution, and extracted with water. The aqueous extract was separated and evaporated to dryness at room temperature and reduced pressure. The residue was dissolved in the minimum quantity of water and diluted with a large excess of acetone. The resulting crystalline precipitate was filtered off, washed with acetone, and again dissolved and precipitated, after which it was dried.

The product was the potassium salt of 7-phenethylmercaptoacetamidocephalosporanic acid, weighing 380 mg., and having a maximum in its ultraviolet absorption spectrum at 258 m$\mu$ ($\epsilon$=8800). It had a median effective dose ($ED_{50}$) against hemolytic streptococci in mice of 12.8 mg./kg.×2.

*Example 2*

7-aminocephalosporanic acid (1.0 g.) was suspended in 50 ml. of water and dissolved by adding sodium bicarbonate (1.0 g.). Acetone (50 ml.) was then added, and the solution was cooled to 5° C. and stirred while 0.846 g. of (3'-phenyl-n-propyl) mercaptoacetyl chloride in 15 ml. of acetone was added dropwise over a period of one hour. Stirring was continued for one hour at 5° C., and the acetone was then removed by evaporation in a rotating-flask evaporator under vacuum at ordinary temperature. Ethyl acetate (75 ml.) was added, followed by hydrochloric acid to pH 2. After thorough mixing, the layers were separated. The ethyl acetate phase was back-extracted with 75 ml. of water and a sufficient quantity of aqueous 1 N potassium hydroxide solution to reach 5.5. The water layer was separated and evaporated to a semisolid in a rotating-flask evaporator under vacuum at ordinary temperature. The residue was dissolved in methanol, diluted with isopropyl alcohol, and stripped substantially free of solvent. The potassium salt of 7-(3'-phenyl-n-propylmercaptoacetamido)cephalosporanic acid was obtained thereby as a white powder weighing 780 mg. and having a maximum in its ultraviolet absorption spectrum at 259 m$\mu$ ($\epsilon$=8650). The powdered material exhibited the following X-ray diffraction pattern, obtained with nickel-filtered copper radiation of 1.5405 A.U. wavelength and a DeBye-Scherrer camera:

| d | $I/I_1$ |
|---|---|
| 7.01 | .13 |
| 5.56 | .27 |
| 4.71 | 1.00 |
| 4.43 | .67 |
| 4.27 | .67 |
| 3.98 | 1.00 |
| 3.83 | .27 |
| 3.57 | .13 |
| 3.40 | .13 |
| 3.20 | .13 |
| 3.09 | .13 |

It had a median effective dose ($ED_{50}$) against hemolytic streptococci in mice of 16.2 mg./kg.×2.

Also within the scope of the invention is 7-(4'-phenyl-n-butylmercaptoacetamido)cephalosporanic acid and the salts thereof, prepared by the techniques described hereinabove.

While the invention has been illustrated with certain specific embodiments thereof, bearing a phenyl ring, it will be understood that the said phenyl ring may have one or more substituents without altering the properties of the complete compound in such a way as to take it outside the scope of the invention. Among such substituents are chloro, bromo, fluoro, trifluoromethyl, methyl, methoxy, hydroxy, and the like.

I claim:
1. An antibiotic substance having the formula:

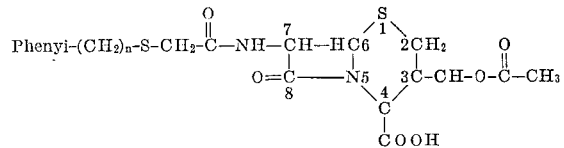

in which $n$ is 2, 3, or 4; and the salts thereof with pharmaceutically acceptable cations.

2. An antibiotic substance as in claim 1, said antibiotic substance being 7-phenethylmercaptoacetamidocephalosporanic acid.

3. An antibiotic substance as in claim 1, said antibiotic substance being 7 - (3' - phenyl-n-propylmercaptoacetamido)cephalosporanic acid.

4. An antibiotic substance as in claim 1, said antibiotic substance being 7-(4'-phenyl-n-butylmercaptoacetamido)-cephalosporanic acid.

References Cited

UNITED STATES PATENTS 3,079,306  2/1963  Offe et al. _____ 260—239.1
3,222,363  12/1965  Flynn _____ 260—243

NICHOLAS S. RIZZO, *Primary Examiner.*

JAMES W. ADAMS, JR., *Assistant Examiner.*